Oct. 12, 1965   B. F. HART   3,211,032
METHOD AND APPARATUS FOR PERFORATING A MOVING
HELICAL STRIP WOUND EDGEWISE
Original Filed Dec. 8, 1959   2 Sheets-Sheet 1
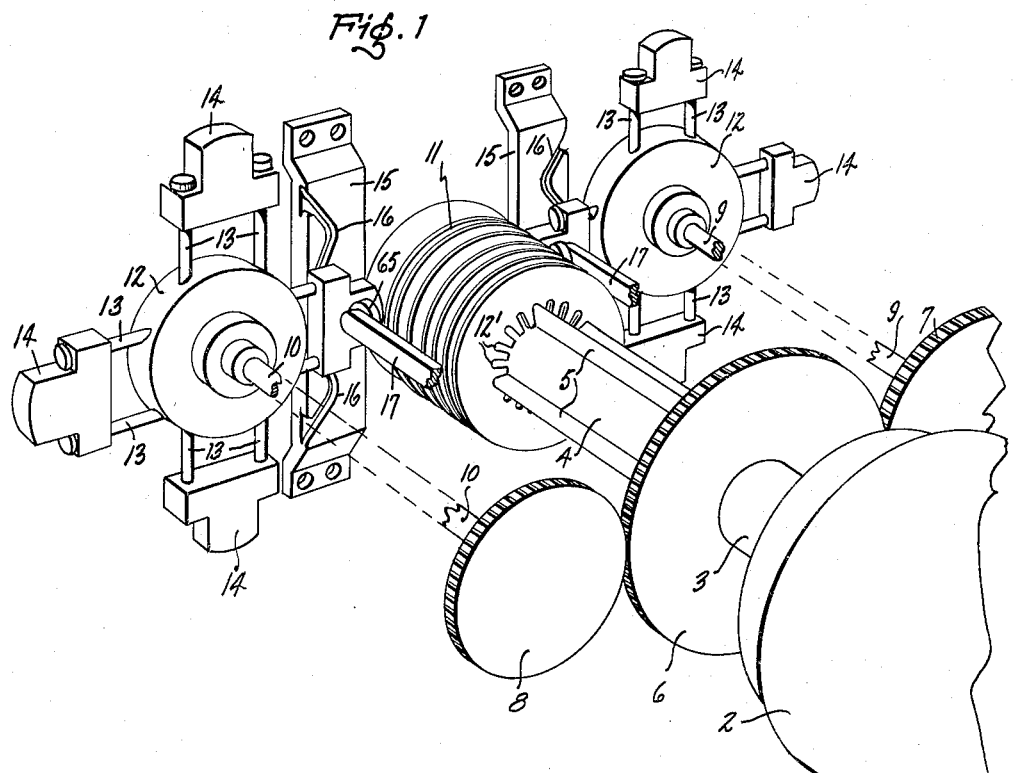
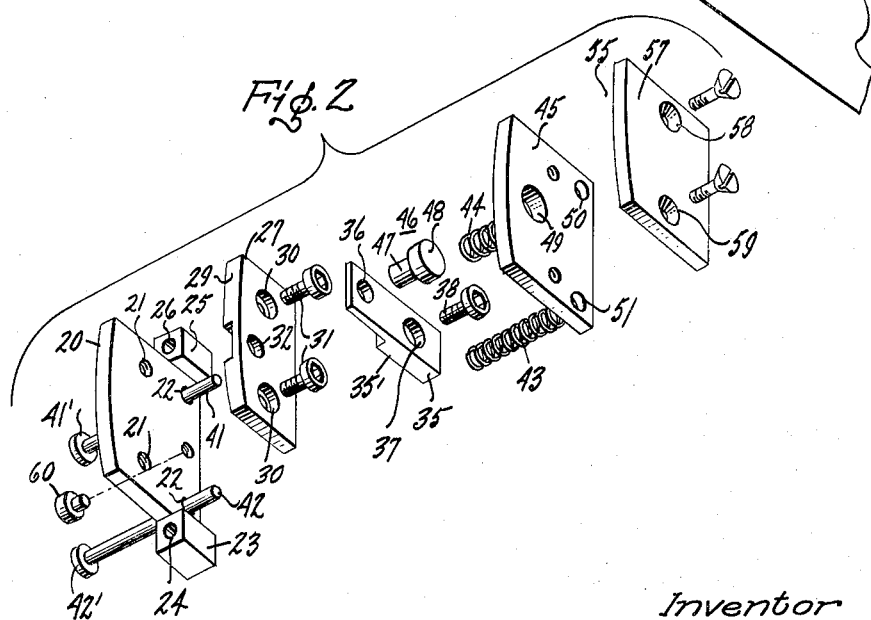
Inventor
Benjamin F. Hart
by Paul A. Frank
His Attorney

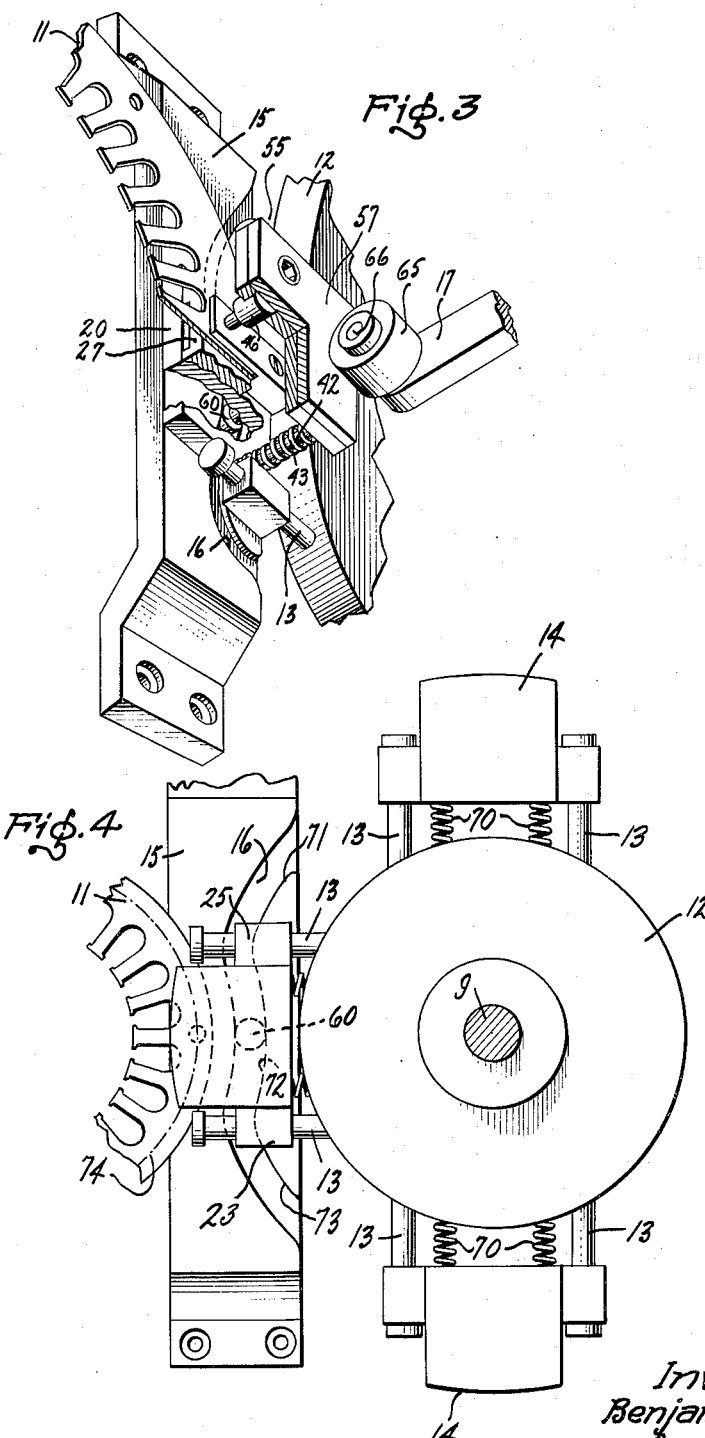

United States Patent Office 3,211,032
Patented Oct. 12, 1965

3,211,032
METHOD AND APPARATUS FOR PERFORATING A MOVING HELICAL STRIP WOUND EDGEWISE
Benjamin F. Hart, Ballston Lake, N.Y., assignor to General Electric Company, a corporation of New York
Continuation of application Ser. No. 858,197, Dec. 8, 1959. This application May 2, 1963, Ser. No. 285,170
9 Claims. (Cl. 83—38)

The present application is a continuation of my co-pending application, Serial No. 858,197, filed December 8, 1959, now abandoned.

This invention relates to a method and apparatus for piercing a moving strip, and more particularly, to a method and apparatus for piercing spaced openings in a moving helically wound strip.

The large majority of stator constructions for electric motors are formed by stacking and aligning stamped discs. These discs have formed therein notches which ultimately form the electrical winding slots in the stator and also contain therein aligned holes through which mounting bolts are passed.

It has been suggested that such stator constructions be fabricated of continuous helically wound notched strips of metal such as core iron or silicon steel to eliminate the waste of materials in normal fabrication methods wherein the discs are stamped from sheet material. Helically winding stators not only reduces material cost but also achieves considerable savings by reducing labor costs.

However, certain problems are encountered in forming stators by helical winding. These difficulties arise from the non-homogeneous nature of the metal used and also as a result of the manner in which the notched strip material is placed into a helical form. A winding operation naturally distorts the material. The winding of a non-homogeneous strip results in non-uniform stretching of the material and, therefore, the mounting holes placed in the strip prior to winding undergo distortion to a non-circular configuration for which compensating measures can not readily be contrived. Furthermore, these non-uniform holes are not uniformly spaced and therefore when the laminated structure is completed it is found that these irregular openings in the strip are not in alignment.

To obviate these problems it has been suggested that the holes be drilled in the assembled laminated construction. Unfortunately, any drilling after the stator is completed is accompanied by a certain amount of swaging along the entire depth of the hole drilled. This swaged area may short circuit the stator laminations and very often make the stator construction so drilled unsuitable for use.

The chief object of the present invention is to provide an improved method and apparatus for piercing holes in a moving strip.

Another object of the invention is to provide an improved method and apparatus for moving a strip in an arcuate path and moving a tool in substantially the same arcuate path while piercing the strip.

A further object is to provide an improved method and apparatus for moving a tool in an arcuate path, at substantially the same speed at a predetermined point on a strip also moving in substantially the same arcuate path while simultaneously piercing the strip at the predetermined point.

These and other objects of my invention will become more apparent from the following description.

In carrying out the objects in one form thereof, I provide a method for successively piercing individual turns of a revolving thin strip of metallic material wound edgewise into a permanently formed helix. Initially, the sides of the helical turns are individually rotated through a definite arcuate path of preselected angular distance or length, the rotating turns being successively advanced edgewise along the axis of rotation, and at least one piercing tool is guided into the arcuate path, next to a predetermined location or point on the side of the revolving strip. The helical turn and the tool, moving coincident with and adjacent the predetermined point, are concurrently driven through the arcuate path in the same direction and at the same speed for the preselected angular distance. At this time, the strip side is pierced at the desired location by the tool which travels along with the strip through the arcuate path, both immediately before and after the piercing operation to permit the cutting action to be completely accomplished during the coincident movement through the path.

By a further aspect of the invention, I provide an improved apparatus particularly adapted to carry out the above method. In the illustrated embodiment, the apparatus includes means for rotating the strip turns about a first axis and individually through the arcuate path which has the first axis as its center of revolution. At least one piercing tool, having a die and cooperating punch arranged to straddle and engage the predetermined point on the helical turn side, is mounted for rotation around a second axis, generally parallel to the first axis. The apparatus further includes means to establish a preselected relationship or synchronization between the rotation of the tool and of the strip turn so that the tool is moved into the arcuate path at the correct time and with the proper speed for accurately piercing the strip side at the desired location. The tool is movably supported in the apparatus for radial motion relative to the two axes, allowing the tool to pass into, through, and out of the arcuate path where actuating means operates the tool to effect the cutting of the strip side at the predetermined point.

The invention will be more clearly understood from the detailed description of a preferred embodiment described in the accompanying drawings, in which FIGURE 1 is a perspective view of an apparatus employing the present invention;

FIGURE 2 is an exploded perspective view of a punch carrier used in FIGURE 1;

FIGURE 3 is an enlarged perspective view partly in section of a punch carrier piercing a helical strip, and FIGURE 4 is a view taken in a plane normal to the axis of rotation of the strip showing the action of guide means upon the punch carrier.

Referring to FIGURE 1 there is shown an apparatus employing the present invention which includes a motor 2 having extending therefrom a drive shaft 3. Drive shaft 3 is suitably attached to an arbor 4 having suitable splines 5. This apparatus as shown is adapted to pierce holes in a helically wound strip 11 which is suitably mounted on a splined arbor 4. This helically wound strip is later compressed and adjacent windings are connected to form the stator of an electric motor. The openings pierced in strip 11 are so arranged as to be in alignment to permit mounting bolts to be passed therethrough, thereby permitting the attachment of the stator to the remaining motor structure. The helically wound strip is provided with spaced notches 12' and splines 5 on arbor 4 are adapted to pass into these notches to align them on the arbor.

In order to pierce the helical strip to provide the bolt mounting holes, two punch carriers 12 are provided located on either side of the arbor. It will be appreciated that these individual holes must be aligned and to achieve such alignment a predetermined relationship must be established between the rotation of punch carrier wheels 12 and rotating arbor 4. This may be achieved by means of gear 6 mounted on drive shaft 3. Gear 6 meshes with smaller gears 7 and 8, gear 7 being mounted on shaft 9 and gear 8 being mounted on shaft 10. By suitably sizing gears 6, 7, and 8, the speed of punch carrier wheels 12 can be adjusted with respect to the rotational speed of arbor 4 to control the number and spacing of the pierced holes in rotating helical strip 11.

Each punch carrier wheel 12 has extending therefrom a plurality of radially extending guide rods 13 upon which are reciprocally mounted punch carriers 14. In the present embodiment each punch carrier wheel 12 is provided with eight guide rods 13 and four punch carriers 14. As the punch carrier wheel rotates the punch carrier engages cam 15 having a surface 16 which guides the punch carrier into a predetermined relationship with rotating helical strip 11. Punch carrier 14 has a surface which engages stationary cam follower 17 causing a punch member in the punch carrier to pierce one of the predetermined points on the helically wound strip.

In FIGURE 2 there is shown an exploded view of a punch carrier 14 which is mounted on a punch carrier wheel 12 shown in FIGURE 1. Each punch carrier includes a back-up plate 20 provided with two threaded holes 21 and a pair of guide holes 22. On either side of the back-up plate there are provided two support blocks 23 and 25. Support block 23 is provided with a cylindrical bearing hole 24 and support block 25 is provided with a cylindrical bearing hole 26. The back-up plate is reciprocally driven on guide rods 13 shown in FIGURE 1 by the coaction of cam follower 60 mounted on the back-up plate with surface 16 in a manner to be more fully described hereinafter.

A die 27 having suitable counter sunk holes 30 adapted to be in alignment with holes 21 of back-up plate 20 is attached by means of bolts 31 to back-up plate 20. Die 27 is provided with an opening 32 which is adapted to receive piercing portion 47 of punch 46.

Support member 35 is mounted adjacent the support plate 27 and includes an opening 36 which is in alignment with opening 32 of die 27. This opening is also intended to receive portion 47 of punch 46. Support member 35 is provided with an opening 37 through which is passed a bolt 38. This bolt 38 engages a suitable threaded opening in back-up plate 20.

Punch 46 has a head portion 48 which is adapted to be shrunk-fit into opening 49 of punch holder 45. Punch holder 45 is a flat, planar member and has provided therein two openings 50 and 51. These openings are adapted to have shrunk-fit thereinto guide members 41 and 42 which are adapted to be in sliding bearing contact with the surface of holes 22 provided in back-up plate 20. In order that punch 46 remains in the retracted position, springs 43 and 44 are provided which are mounted about guide members 41 and 42.

If desired, the distance that punch 45 is retracted may be limited by suitable means such as abutting shoulders 41' and 42' on guide members 41 and 42 acting against suitable abutments on back-up plate 20.

In order to actuate the punch a suitable pressure plate 55 having a suitable cam surface 57 is provided. This pressure plate may be attached to punch holder 45 by means of suitable flat-head machine screws which extend through tapered holes 58 and 59 and engage suitable threaded holes in member 45.

It can be seen from the construction described that upon the application of pressure on pressure plate 55, the bias of springs 43 and 44 will be overcome sufficiently for punch 46 to advance toward die 27. Piercing portion 47 of punch 46 will then pass into the space between support member 35 and die 27 to suitably pierce the helical strip passing therebetween.

FIGURE 3 shows a perspective view partly in section, of an assembled punch carrier cooperating with cam member 15 to pierce a portion of strip 11. Cam follower 17 is provided with roller member 65 rotatably mounted upon a suitable stub shaft 66. Cam follower roller 65 engages surface 57 of pressure plate 55 urging forward the reciprocally mounted members 55, 45 and punch 46. Punch 46 moves so that it pierces strip 11 which is passing between support member 35 and die 27. If desired, suitable guide means (not shown) may be utilized to guide the strip into proper space relationship with respect to the space between support member 35 and die 27 of the punch carrier.

This view of the apparatus discloses cam surface 16 with cam follower 60 mounted on punch carrier 14 riding in the cam. Cam follower 60 is mounted on back-up plate 20 (see FIGURE 2). It can be seen that by rotation of the punch carrier wheel, cam follower 60 engages surface 16 thereby affecting the radial distance of the punch carrier with respect to shaft 9 upon which the punch carrier wheel rotates. Because back-up plate 20 is provided with support blocks 23 and 25 having suitable bearing holes 24 and 26, the punch carrier is capable of reciprocal movement on guide rods 13.

FIGURE 4 discloses a view showing the relationship between strip 11, cam 15 and punch carrier wheel 12. Cam surface 16 of cam member 15 has two arcuate portions 71 and 73 which have their center substantially on the axis of shaft 9. Portions 71 and 73 are suitably connected by an arcuate portion 72 which substantially has its center about the axis of arbor 4 shown in FIGURE 1.

It can be seen that when shaft 9 with the punch carrier wheel rotates in a counter-clockwise direction the punch carrier will have its follower 60 first engage arcuate portion 71 of cam surface 16. As the punch carrier wheel continues to move cam follower 60 passes into arcuate portion 72. At this point the punch intersects a circle 74 about the arbor axis. The projection of circle 74 defines a cylindrical surface along which predetermined points on strip 11 move at a predetermined speed determined by gears 6, 7 and 8 shown in FIGURE 1. It is desirable that each predetermined point on this projected circle 74 travel at the same speed as the punch while the punch carrier has its cam follower 60 in arcuate portion 72 of cam surface 16. It will be appreciated that as the punch carrier wheel rotates, punch 46 will intersect and move adjacent a predetermined point on strip 11. This predetermined point and the punch will move substantially at the same speed. When cam follower 17 engages punch carrier 14 the cam follower will cause the punch to pass through the strip. After the punch passes through the arcuate portion 72, it enters arcuate portion 73 and remains in this outer position in response to biasing means such as springs 70 shown in FIGURE 4.

Considering the operation of the present invention, a helically wound strip is mounted on arbor 4 which is rotating at a predetermined speed with respect to punch carrier wheels 12. The punch carrier wheels rotate in a counter-clockwise direction while arbor 4 rotates in a clockwise direction. The punch carriers are biased in their outermost position as shown in FIGURE 1. As a particular punch carrier approaches cam 15, a particular arcuate section of the helical strip passes between support member 35 and die 27 of the punch carrier. Simultaneously, the punch carrier passes under the influence of cam surface 16. Initially cam follower 60 associated with the punch carrier engages arcuate portion 71 of cam surface 16 and the punch on the punch carrier advances until it reaches a predetermined arc of circle 74 about the arbor 4 axis. At this point, the punch carrier moves radially inward in response to portion 72 of cam surface 16 which guides the punch carrier in a manner so that punch 46 follows arc 74. Substantially mid-way along this surface 72, strip 11 and the punch carrier are moving at substantially the same speed on the same arc and cam follower 17 which is a stationary member engages pressure plate 55 of the punch carrier urging the punch to pierce strip 11. After passing the cam follower springs 43 and 44 (FIGURE 2) retract the punch and cam follower 60 (FIGURE 4) enters portion 73 of cam surface 16.

It will be appreciated that the piercing method and apparatus described may be utilized in applications other than the fabrication of stators for electric motors, for example, piercing fins on helically wound fin tube heat exchangers. The present invention discloses two punch carrier wheels with four punch carriers mounted upon each wheel. If desired, a different number of wheels may be utilized with fewer or more punch carriers depending upon the application and the operational speed of the wheels and arbors.

While there has been described preferred embodiments of the present invention, it will be appreciated that the invention is not limited thereto but that various modifications may be made without departing from the scope of the appended claims.

What I claim as new and desire to secure by Letters Patent of the United States is:

1. In a method for individually piercing a number of successive turns of a strip wound edgewise into a helix, the steps which comprise: rotating a number of turns of the helically wound strip edgewise about an axis while successively advancing the rotating turns edgewise along the axis and through a definite arcuate path, moving at least one tool adjacent a predetermined point on the sides of an individual helical turn as the rotating turn advances edgewise along the axis and through said path, moving the tool along said arcuate path adjacent said predetermined point, and urging the tool toward the helical turns and into cutting engagement with the strip turn while traveling through said arcuate path to pierce the strip axially at the predetermined point.

2. In a method for individually piercing successive turns of a strip would edgewise into a helix, the steps which comprise: rotating the helically wound strip about a first axis, rotating at least one cutting tool about a second axis disposed from the first axis, moving the cutting tool radially of the second axis so that the tool moves adjacent a predetermined point on the sides of the helical turn, moving the predetermined point on the strip and the tool along a common arcuate path at the same speed and in the same direction, and urging the tool toward the helical turn into cutting engagement therewith to pierce the strip at the predetermined point.

3. A method for successively piercing individual turns of a revolving thin strip of material wound edgewise into a permanently formed helix comprising the steps: rotating the permanently formed helical turns edgewise about an axis while successively advancing the turns along the axis and individually through an arcuate path having a center revolution generally at the axis, moving at least one cutting tool adjacent a predetermined point on the side of the revolving strip as said helical turns travel edgewise about the axis and successively through the arcuate path, and passing the cutting tool and an individual helical turn concurrently through said arcuate path at the same speed and in the same direction while piercing the side of said turn at the predetermined point by operation of the cutting tool.

4. In a method for successively piercing individual turns of a revolving thin metal strip of material formed edgewise into a helix comprising the steps: rotating the formed helical turns edgewise around an axis while successively advancing the turns edgewise along the axis and individually through an arcuate path of preselected angular length; guiding at least one cutting tool, having a pair of coperating cutting members, into said arcuate path, adjacent a predetermined point on the side of an individual turn as the turn travels through said arcuate path; passing the cutting tool and the predetermined point on the individual helical turn concurrently through said arcuate path in the same direction and at the same speed, with the cutting members straddling the turn at the predetermined point; and piercing the side of said turn at the predetermined point by operation of the cutting tool during the coincident movement through said arcuate path, with the coincident movement of the cutting tool and individual turn through said arcuate path occurring before, during, and immediately after piercing engagement therebetween to permit a completed piercing operation during such coincident movement.

5. In a method for successively cutting the individual turns of a revolving thin strip of material formed edgewise into a formed helix comprising the steps: rotating the helical turns about an axis and individually through a definite arcuate path having a center of revolution generally at that axis; rotating at least one cutting tool having cooperating cutting members into, through, and out of said arcuate path; passing the tool and an individual helical turn coincidently through said arcuate path at the same speed and in the same direction, with the cutting members being disposed adjacent a predetermined location on the turn sides; and causing the cooperating cutting members to cut the predetermined location as the tool and strip turn travel in coincidence through said arcuate path; removing the cooperating members from cutting engagement with the strip turn during such coincident travel through said arcuate path; and rotating said tool away from said arcuate path.

6. In an apparatus for piercing the individual turns of a strip edgewise into a helix, the combination of means for rotating the strip turns about a first axis and individually through a definite arcuate path; at least one piercing tool revolvable about a second axis separated in spaced relation with respect to the first axis; means for revolving the piercing tool about the second axis and for mounting the tool for movement toward and away from at least the first axis; means for guiding the piercing tool through said arcuate path; means for driving the tool adjacent a predetermined point on the sides of an individual helical strip turn at substantially the same speed and in the same direction as that of the predetermined point as the tool and strip turn travel concurrently through said path; and means for operating said tool into cutting engagement with the strip turn at the predetermined point during such concurrent travel to pierce the side of the strip turn.

7. In an apparatus for successively piercing individual turns of a revolving metal strip wound edgewise into a helix; means for rotating the turns about a first axis and individually through a definite arcuate path having a center of revolution generally at said axis; a revolvable rotor means mounting at least one piercing tool for rotation about a second axis separated in spaced relation with respect to said first axis and for movement toward and away from said first axis; said tool having a cutting position; cam means for guiding the tool through said arcuate path next to a predetermined location on the strip turn; means for revolving said rotor means around the second axis and for driving said tool through said definite arcuate path in the same direction and at the same speed as the strip turn, coincident with the predetermined location; means for operating said tool to its cutting position for piercing the strip turn at the predetermined location during its travel through said definite arcuate path; and means for removing said tool from its cutting position as it travels along said definite arcuate path, said tool and strip turn having coincident movement through said definite arcuate path both during and after the strip has been pierced to permit a completed cutting action.

8. An apparatus for successively piercing individual turns of a revolving metal strip wound edgewise into a helix comprising: means for rotating the turns about a first axis and individually through an arcuate path of preselected angular length having a center of revolution generally at said axis; at least one piercing tool including cooperating cutting members having cutting and retracted positions, movably mounted on the apparatus and being rotatable about a second axis separated in spaced relation with regard to the first axis; means for guiding the tool through said arcuate path adjacent a predetermined location on the strip turn; means biasing said cutting members toward the retracted position; means for rotating said piercing tool around the second axis and for driving said tool through the angular length of said path in the same direction and at the same speed as the strip turn, with the tool members straddling and being coincident with the predetermined point; means for overcoming the biasing means thereby actuating said tool members into said cutting position to pierce the strip turn at the predetermined location during the travel through said arcuate path; said biasing means returning said cutting members to the retracted position as said tool travels along said path, whereby said tool and strip turn have coincident movement through said path immediately before, during, and after the piercing operation to permit a complete cutting action.

9. In an apparatus for successively piercing individual turns of a revolving metal strip wound edgewise into a helix; means for rotating the turns about a first axis and individually through an arcuate path of preselected angular length having a center of revolution generally at said first axis; a rotor arranged to revolve about a second axis disposed generally parallel and being separated in spaced relation with respect to said first axis; a piercing tool including a die and cooperating punch, having cutting and retracted positions, movably mounted on said rotor; cam means for guiding the tool through said arcuate path next to a predetermined point on the strip turn, with the tool being movable toward and away from said second axis as it travels through the angular length of said arcuate path; means for driving said tool through said path in the same direction and at the same speed as the strip turns, with said die and cooperating punch straddling and being coincident with the predetermined point; means disposed adjacent said arcuate path for operating said die and cooperating punch to their cutting position for piercing the strip turn at the predetermined point during its travel through said arcuate path; and means for returning said die and cooperating punch to the retracted position as the tool travels along said path whereby said tool and strip turn have coincident movement through said path before, during, and after the piercing operation to permit a complete cutting action.

References Cited by the Examiner

UNITED STATES PATENTS 2,619,177 11/52 Praturlon _____ 83—338
3,126,779 3/64 Welch et al. _____ 83—338

WILLIAM W. DYER, JR., *Primary Examiner.*

WILLIAM S. LAWSON, *Examiner.*